(12) United States Patent
Page et al.

(10) Patent No.: US 12,525,805 B2
(45) Date of Patent: Jan. 13, 2026

(54) POWER CONTROL SYSTEM

(71) Applicant: Mitsubishi Electric Corporation, Tokyo (JP)

(72) Inventors: Frederick Page, Tokyo (JP); Kazuyori Tahata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 71 days.

(21) Appl. No.: 18/712,384

(22) PCT Filed: Feb. 4, 2022

(86) PCT No.: PCT/JP2022/004509
§ 371 (c)(1),
(2) Date: May 22, 2024

(87) PCT Pub. No.: WO2023/148936
PCT Pub. Date: Aug. 10, 2023

(65) Prior Publication Data
US 2025/0015596 A1    Jan. 9, 2025

(51) Int. Cl.
*H02J 3/28* (2006.01)
*H02J 3/00* (2006.01)
(Continued)

(52) U.S. Cl.
CPC ............... *H02J 3/28* (2013.01); *H02J 3/007* (2020.01); *H02J 7/0013* (2013.01); *H02J 7/04* (2013.01); *H02J 7/345* (2013.01)

(58) Field of Classification Search
None
See application file for complete search history.

(56) References Cited

U.S. PATENT DOCUMENTS

2013/0169064 A1\* 7/2013 Park .................. H02J 3/381
307/112
2013/0234517 A1  9/2013 Uchida
(Continued)

FOREIGN PATENT DOCUMENTS

JP    H02266870 A    10/1990
JP    2000262072 A    9/2000
(Continued)

OTHER PUBLICATIONS

International Search Report (PCT/ISA/210) with translation and Written Opinion (PCT/ISA/237) mailed on Mar. 22, 2022, by the Japanese Patent Office as the International Searching Authority for International Application No. PCT/JP2022/004509. (9 pages).

*Primary Examiner* — Rexford N Barnie
*Assistant Examiner* — Aqeel H Bukhari
(74) *Attorney, Agent, or Firm* — Buchanan Ingersoll & Rooney PC

(57) ABSTRACT

A power control system includes: a first energy storage system; a bidirectional AC/DC converter connected between an AC power system and the first energy storage system; and a control device for controlling an operation of the bidirectional AC/DC converter. The control device controls the operation of the bidirectional AC/DC converter to control charging and discharging of the first energy storage system. The power control system includes: a circuit breaker connected between the AC power system and the bidirectional AC/DC converter; a resistor connected between the circuit breaker and the bidirectional AC/DC converter; and a switch for forming a discharge path for discharging the DC power of the first energy storage system via the resistor, while the circuit breaker is open.

20 Claims, 11 Drawing Sheets

(51) Int. Cl.
*H02J 7/00* (2006.01)
*H02J 7/04* (2006.01)
*H02J 7/34* (2006.01)

(56) References Cited

U.S. PATENT DOCUMENTS

2023/0291303 A1\* 9/2023 Unru ........................ H02M 1/32
2024/0266834 A1\* 8/2024 Hafner ....................... H02J 3/28

FOREIGN PATENT DOCUMENTS

| JP | 2002374629 A | 12/2002 |
| JP | 2014030289 A | 2/2014 |
| WO | 2013136413 A1 | 9/2013 |

\* cited by examiner (a)

(b)

POWER CONTROL SYSTEM

TECHNICAL FIELD

The present disclosure relates to a power control system.

BACKGROUND ART

In the facilities for stabilizing the frequency of a power system, the discharge energy of a large capacitor disposed on the direct current (DC) side of the power system is converted into an alternating-current (AC) power by a power converter and the AC power is emitted to the AC system. The AC power of the power system, in contrast, is converted into DC power by a power converter, and the DC power is absorbed into a large capacitor as charge energy. The large capacitor is, for example, an electrical double layer capacitor (EDLC), which is also referred to as a supercapacitor or ultracapacitor.

Even in a secondary battery power storage system referred to as a battery energy storage system (BESS), the same functionality as the above facilities can be implemented. Specifically, the discharge energy of a storage battery on the DC side is emitted to the AC system via a power converter, and the AC power of the AC system is absorbed into a storage battery as a charge energy via a power converter.

The stabilization of the frequency, load leveling, etc. of the power system can be expected by interconnecting the power storage device on the DC side to the AC system via a power converter and using the DC energy stored in the power storage device. As a system combining a power converter with an energy storage system such as a storage battery in such a way, for example, Japanese Patent Laying-Open No. 2014-30289 (PTL 1) discloses a power storing and charging apparatus for charging a storage battery with the voltage on the system side to via a bidirectional AC/DC inverter and a DC/DC converter.

CITATION LIST

Patent Literature

PTL 1: Japanese Patent Laying-Open No. 2014-30289

SUMMARY OF INVENTION

Technical Problem

For example, with an increase of renewable energy power supplies in recent years, there is a tendency to demand a power control system capable of quick response and a large output power. In order to implement a power control system capable of quick response and a large output power, a system configuration combining a power converter and a large-capacity power storage device is contemplated. In a typical storage system, a charge device and a discharge device are provided separately. If these devices are applied to the above system configuration, however, the size of the storage system is increased.

An object of the present disclosure according to a certain aspect is to provide a power control system combining an energy storage system with a power converter, which enables charging and discharging of the energy storage system, without increasing the size of the power control system.

Solution to Problem

A power control system according to a certain embodiment includes: a first energy storage system configured to store input DC power as energy and output the stored energy as DC power; a bidirectional AC/DC converter for converting the DC power of the first energy storage system into AC power and converting AC power of an AC power system into the DC power, the bidirectional AC/DC converter being connected between the AC power system and the first energy storage system; and a control device for controlling an operation of the bidirectional AC/DC converter. The control device controls the operation of the bidirectional AC/DC converter to control charging and discharging of the first energy storage system. The power control system further includes: a circuit breaker connected between the AC power system and the bidirectional AC/DC converter; a resistor connected between the circuit breaker and the bidirectional AC/DC converter; and a switch for forming a discharge path for discharging the DC power of the first energy storage system via the resistor while the circuit breaker is open.

A power control system according to another embodiment includes a first energy storage system and a second energy storage system. The first energy storage system and the second energy storage system are each configured to store input DC power as energy and outputs the stored energy as DC power. The power control system further includes: a bidirectional AC/DC converter connected between an AC power system and the first energy storage system; a bidirectional DC/DC converter connected between the first energy storage system and the second energy storage system; a parallel circuit connected between the AC power system and the bidirectional AC/DC converter; and a control device for controlling an operation of each of the bidirectional AC/DC converter and the bidirectional DC/DC converter. The parallel circuit includes a resistor and a bypass switch for bypassing the resistor, the bypass switch being connected in parallel to the resistor. After completion of charging of the first energy storage system with DC power and before a start of charging of the second energy storage system with DC power, the bypass switch is closed. The control device controls the bidirectional AC/DC converter to convert AC power of the AC power system into DC power and outputs the DC power to the first energy storage system, and control the bidirectional DC/DC converter to transfer the DC power from the first energy storage system to the second energy storage system, to charge the second energy storage system with the DC power.

Advantageous Effects of Invention

According to the present disclosure, a power control system combining an energy storage system with a power converter enables charging and discharging of the energy storage system, without increasing the size of the power control system.

DESCRIPTION OF EMBODIMENTS

Hereinafter, embodiments are described, with reference to the accompanying drawings. In the following description, like reference signs refer to like parts. Their names and functionalities are also the same. Thus, detailed description thereof will not be repeated.

Embodiment 1

<Configuration of Power Control System>

Figure 1:
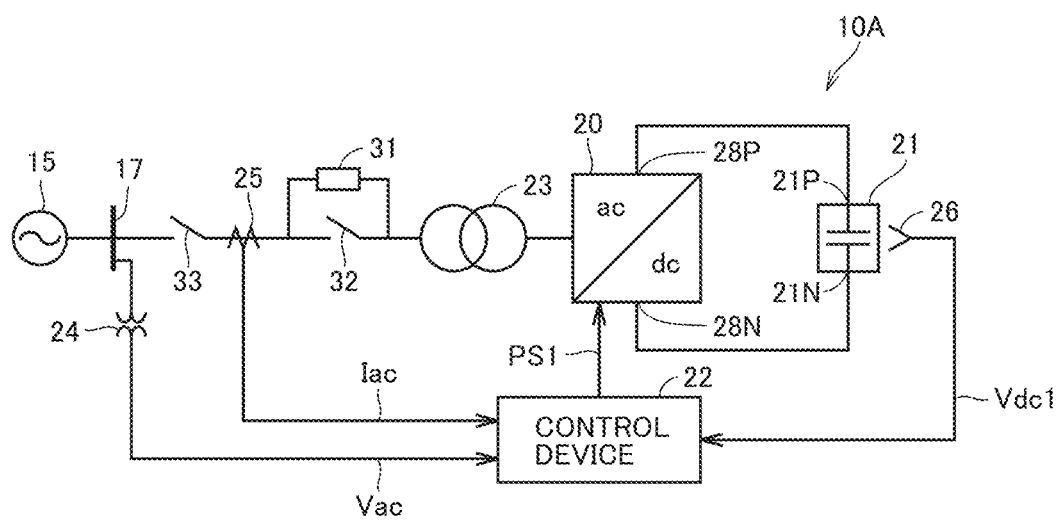
FIG. 1 is a block diagram showing a configuration of a power control system according to Embodiment 1.

FIG. 1 is a block diagram showing a configuration of a power control system 10A according to Embodiment 1. In FIG. 1, two connecting terminals are disposed on the direct-current (DC) side of a bidirectional AC/DC converter 20 that is configured as a self-commutated converter. Note that the alternating-current (AC) side of the bidirectional AC/DC converter 20 is connected to a three-phase AC system, and three connecting terminals are therefore provided for u phase, v phase, and w phase. For ease of description, FIG. 1 shows only an AC terminal for one phase. In the following description, the "bidirectional AC/DC converter 20" will also be referred to as a "self-commutated converter 20."

Referring to FIG. 1, the power control system 10A includes the self-commutated converter 20, a first energy storage system (ESS) 21, a control device 22, a transformer 23, an AC voltage detector 24, an AC current detector 25, a DC voltage detector 26, a resistor 31, a bypass switch 32, and a circuit breaker 33.

The first energy storage system 21 is configured to store, as energy, the DC power input via a pair of input and output terminals (i.e., a positive terminal 21P and a negative terminal 21N), and output the stored energy as DC power. The energy stored in the first energy storage system 21 is exploited for the frequency stabilization and load leveling of the AC power system, and is further exploited as a reserve power.

More specifically, the first energy storage system 21 includes multiple power storage elements which are connected in series and in parallel between the positive terminal 21P and the negative terminal 21N. Each power storage element may be, for example, a large capacitor such as an electrical double layer capacitor (EDLC), or a storage battery. FIG. 1 symbolically shows a single power storage element.

The self-commutated converter 20 is connected between the AC power system 15 and the first energy storage system 21. Specifically, the self-commutated converter 20 has a pair of DC terminals (i.e., a positive DC terminal 28P and a negative DC terminal 28N) connected to a pair of input and output terminals (i.e., the positive terminal 21P and the negative terminal 21N), respectively, of the first energy storage system 21. Accordingly, the rated DC voltage of the self-commutated converter 20 and the rated voltage of the first energy storage system 21 are equal. The AC terminal for a respective phase of the self-commutated converter 20 is connected to a power line for a corresponding phase of the AC power system 15.

The self-commutated converter 20 performs forward conversion of converting an AC current into a DC current, and inverse conversion of converting an DC current into an AC current. Specifically, the self-commutated converter 20 converts the AC power of the AC power system 15 into DC power and causes the first energy storage system 21 to absorb the DC power as charge energy. Conversely, the self-commutated converter 20 converts the DC power of the first energy storage system 21 into AC power and emits the AC power as discharge energy to the AC power system 15.

The self-commutated converter 20 includes multiple self turn-off semiconductor devices which are used as switching elements. For example, an insulated gate bipolar transistor (IGBT), a gate commutated turn-off (GCT) thyristor, etc. are used as the self turn-off semiconductor device. The self turn-off semiconductor device is connected in anti-parallel to a freewheeling diode. The self-commutated converter 20 may be a two-level/three-level, furthermore, multi-level converter, a modular multilevel converter (MMC), a transformer multiplexing, a reactor parallel fashion, and a combination thereof.

The transformer 23 is connected between the AC power system 15 and the self-commutated converter 20. The transformer 23 steps up and outputs to the AC power system 15 the AC power output from the self-commutated converter 20. For ease of description, FIG. 1 denotes the transformer 23 as a single-phase transformer. However, delta-Y connection, delta-delta connection, or delta-delta-Y connection, etc. is used in the actual connection of a three-phase transformer. If the self-commutated converter 20 is capable of outputting a high voltage AC voltage, such as a modular multilevel converter, an interconnection reactor may be provided, instead of the transformer 23.

The AC voltage detector 24 detects an AC voltage Vac at the point of interconnection 17 to the AC power system 15 of the power control system 10A. For example, a voltage transformer is used as the AC voltage detector 24.

The AC current detector 25 detects an AC current Iac flowing between the point of interconnection 17 and the transformer 23. For example, a current transformer is used as the AC current detector 25.

The DC voltage detector 26 detects a DC voltage Vdc1 between the pair of the input and output terminals (i.e., the positive terminal 21P and the negative terminal 21N) of the first energy storage system 21.

Based on the detected AC voltage Vac, AC current Iac, and DC voltage Vdc1, the control device 22 generates a control signal (e.g., a pulse width modulation signal) PS1 for controlling the operation of the self-commutated converter 20. The control device 22 controls the operation of the self-commutated converter 20, thereby controlling the charging and discharging of the first energy storage system 21. In normal operation, the control device 22 performs the following control.

Based on a fundamental frequency of the AC power system 15, determined from the AC voltage Vac, the control device 22 performs automated frequency tuning for approximating the detected fundamental frequency to the rated value. The control device 22 performs automated DC voltage regulation for approximating the detection value of the DC voltage Vdc1 of the first energy storage system 21 to a DC voltage target value. In this case, the voltage target value reduces if the active power is emitted to the AC power system 15. The voltage target value increases if the active power is absorbed from the AC power system 15. The automated frequency tuning and the automated DC voltage regulation set an active power target value Pref.

Based on the detection value of the AC voltage Vac, the control device 22 performs automated AC voltage regulation for approximating the detection value of the AC voltage Vac to the rated value. Based on a reactive power measurement value that is calculated from detection values of the AC voltage Vac and the AC current Iac, the control device 22 further performs automated reactive power tuning for approximating the reactive power measurement value to a target value. The automated AC voltage regulation and the automated reactive power tuning set a reactive power target value Qref.

The control device 22 performs variable transformation on the detection value of a three-phase AC current Iac to calculate an active current component and a reactive current component. Similarly, the control device 22 performs variable transformation on the detection value of a three-phase AC voltage Vac to calculate an active voltage component and a reactive voltage component. Based on the calculated active current component, reactive current component, active voltage component, and reactive voltage component, the control device 22 generates a voltage command value Vref for each phase of the self-commutated converter 20 so that the active power target value Pref and the reactive power target value Qref can be obtained.

The control device 22 compares the voltage command value Vref and a carrier signal to generate the PWM signal PS1. The PWM signal PS1 is supplied to control electrodes of the self turn-off semiconductor devices included in the self-commutated converter 20.

The circuit breaker 33 is connected between the AC power system 15 and the self-commutated converter 20. In the example of FIG. 1, the circuit breaker 33 is connected between the point of interconnection 17 and the resistor 31. The resistor 31 is connected between the circuit breaker 33 and the self-commutated converter 20. In the example of FIG. 1, the resistor 31 is connected between the circuit breaker 33 and the transformer 23. The resistor 31 is a resistor element for charging or discharging energy. The bypass switch 32 is a switch that is connected in parallel to the resistor 31 to form a path for bypassing the resistor 31.

<Configuration Between Self-Commutated Converter and Circuit Breaker>

Figure 2:
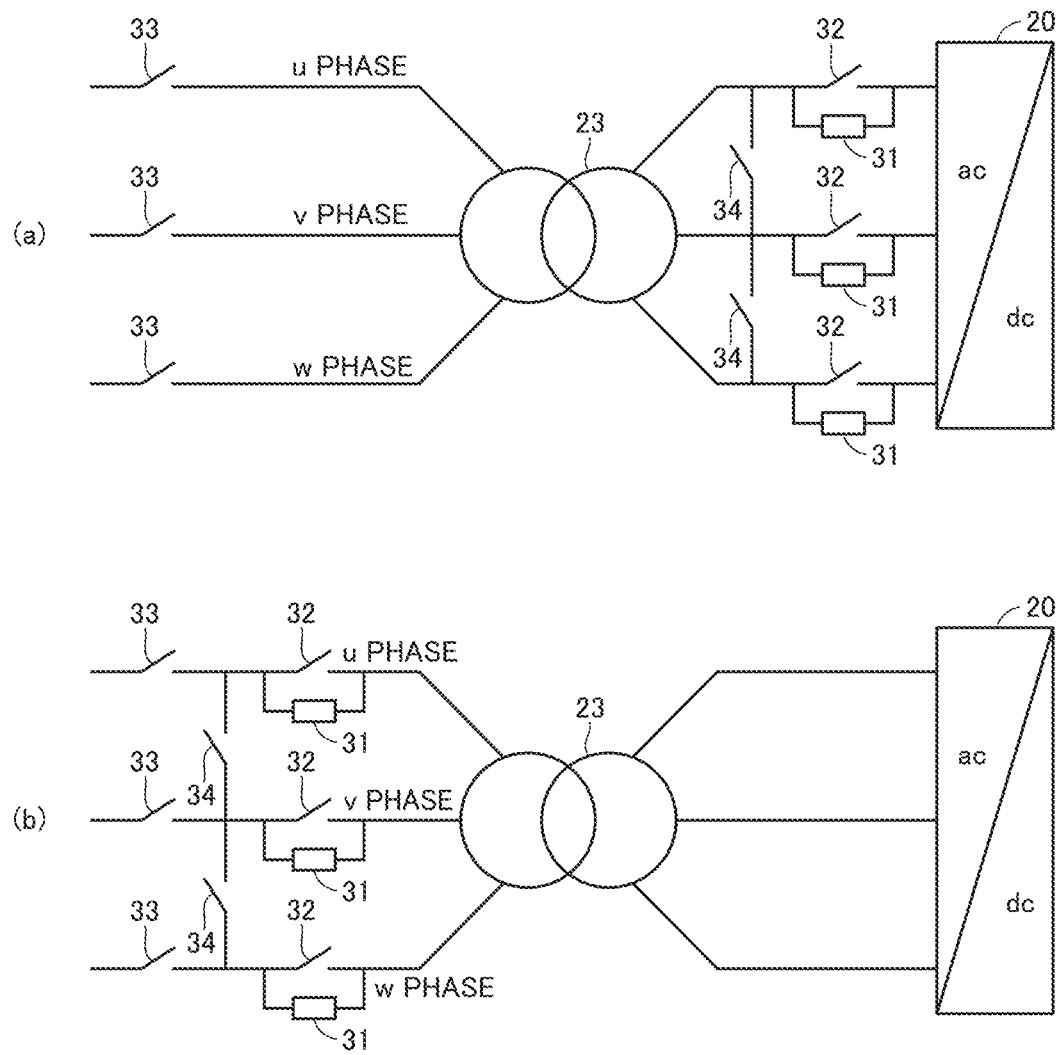
FIG. 2 is a diagram illustrating one example of a circuit structure between a self-commutated converter and circuit breakers.

FIG. 2 is a diagram illustrating one example of a circuit structure between the self-commutated converter 20 and the circuit breakers 33. In the example of FIG. 2, the winding structure of each of the primary winding and the secondary winding of the transformer 23 has a three-phase Y-connected or delta-connected winding structure. The self-commutated converter 20 is configured of a three-leg bidirectional AC/DC converter. Part (a) of FIG. 2 shows a configuration in which a circuit for charging or discharging power is disposed on the secondary side of the transformer 23. Part (b) of FIG. 2 shows a configuration in which such a circuit is disposed on the primary side of the transformer 23.

Referring to (a) of FIG. 2, the primary winding for each phase of the transformer 23 is connected to a circuit breaker 33. The secondary winding for each phase of the transformer 23 is connected to the self-commutated converter 20 via a parallel circuit which includes the resistor 31 and the bypass switch 32. Furthermore, the switches 34 are disposed between the secondary windings. Referring to (b) of FIG. 2, the primary winding for each phase of the transformer 23 is connected to a circuit breaker 33 via a parallel circuit which includes the resistor 31 and the bypass switch 32. The switches 34 are also disposed between the primary windings. The secondary winding for each phase of the transformer 23 is connected to the self-commutated converter 20.

In (a) and (b) of FIG. 2, the respective circuit breaker 33 is opened, the respective switch 34 is closed, and the respective bypass switch 32 is opened, thereby forming a closed circuit which includes the self-commutated converter 20 and the respective resistor 31. As describe below in detail, the respective switch 34 is disposed to form a discharge path for discharging power via the respective resistor 31, while the respective circuit breaker 33 is open.

Figure 3:
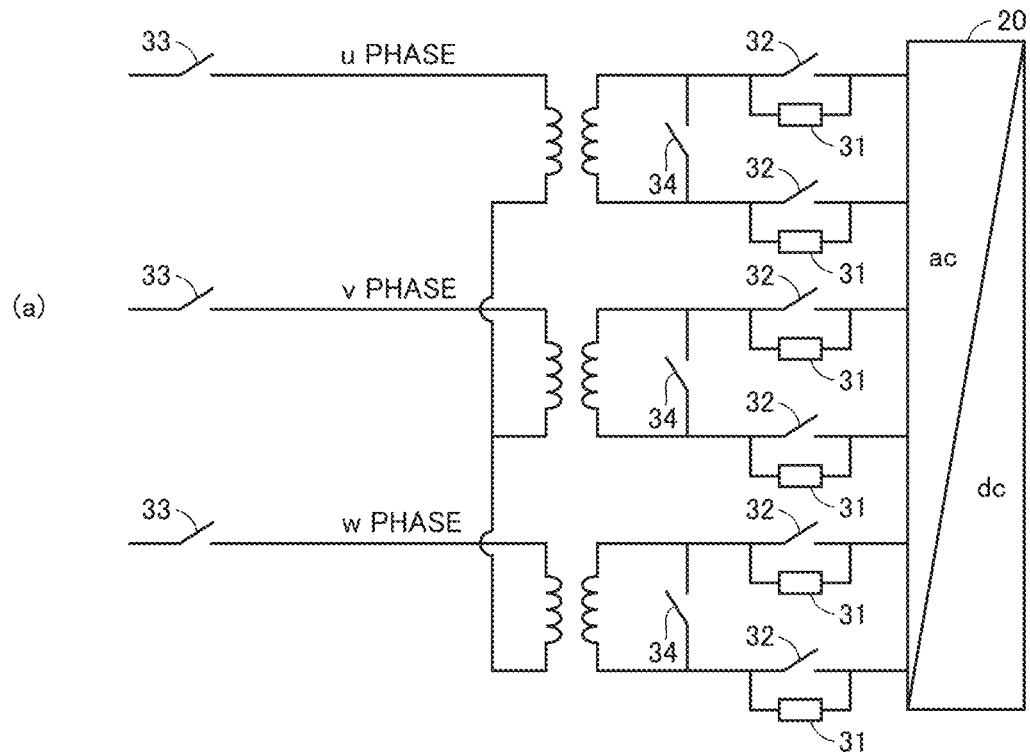
FIG. 3 is a diagram showing another example circuit structure between the self-commutated converter and the circuit breakers.
Figure 3:
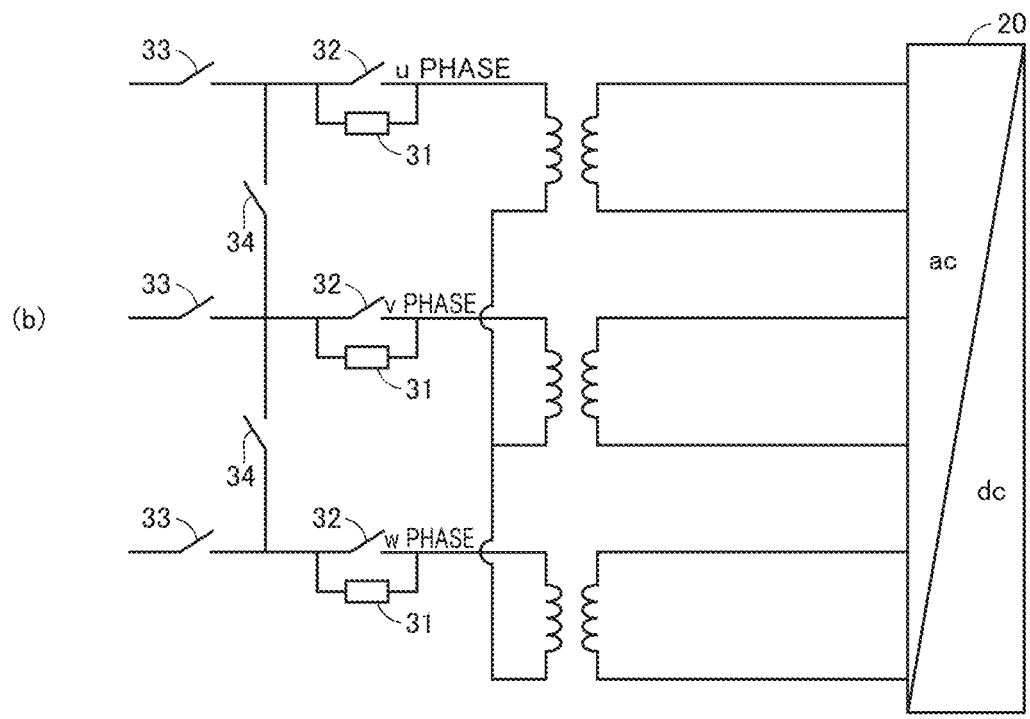

FIG. 3 is a diagram showing another example of the circuit structure between the self-commutated converter 20 and the circuit breakers 33. In the example of FIG. 3, the primary winding of the transformer 23 has a three-phase Y-connected or delta-connected winding structure. The secondary winding of the transformer 23 is configured of an open winding. The self-commutated converter 20 is configured of a six-leg bidirectional AC/DC converter. Part (a) of FIG. 3 shows a configuration in which a circuit for charging or discharging power is disposed on the secondary side of the transformer 23. Part (b) of FIG. 3 shows a configuration in which such a circuit is disposed on the primary side of the transformer 23.

Referring to (a) of FIG. 3, one end of the primary winding for each phase of the transformer 23 is connected to a circuit breaker 33. The other ends of the primary windings for the respective phases are connected to each other. One end and the other end of the secondary winding for each phase of the transformer 23 are connected to the self-commutated converter 20 via a parallel circuit which includes the resistors 31 and the bypass switches 32. The switch 34 is disposed between one end and the other end of the secondary winding for each phase.

Referring to (b) of FIG. 3, one end of the primary winding for each phase of the transformer 23 is connected to a circuit breaker 33 via a parallel circuit which includes the resistor 31 and the bypass switch 32. The other ends of the primary windings for the respective phases are connected to each other. The switch 34 is disposed between the primary windings of respective phases (e.g., between one end of the primary winding of the u phase and one end of the primary winding of the v phase, and between one end of the primary winding of the v phase and one end of the primary winding of the w phase). The self-commutated converter 20 is connected to one end and the other end of the secondary winding of each phase of the transformer 23.

In (a) and (b) of FIG. 3, the respective circuit breaker 33 is opened, the respective switch 34 is closed, and the respective bypass switch 32 is opened, thereby forming a closed circuit which includes the self-commutated converter 20 and the respective resistor 31.

<Hardware Configuration of Control Device>

Figure 4:
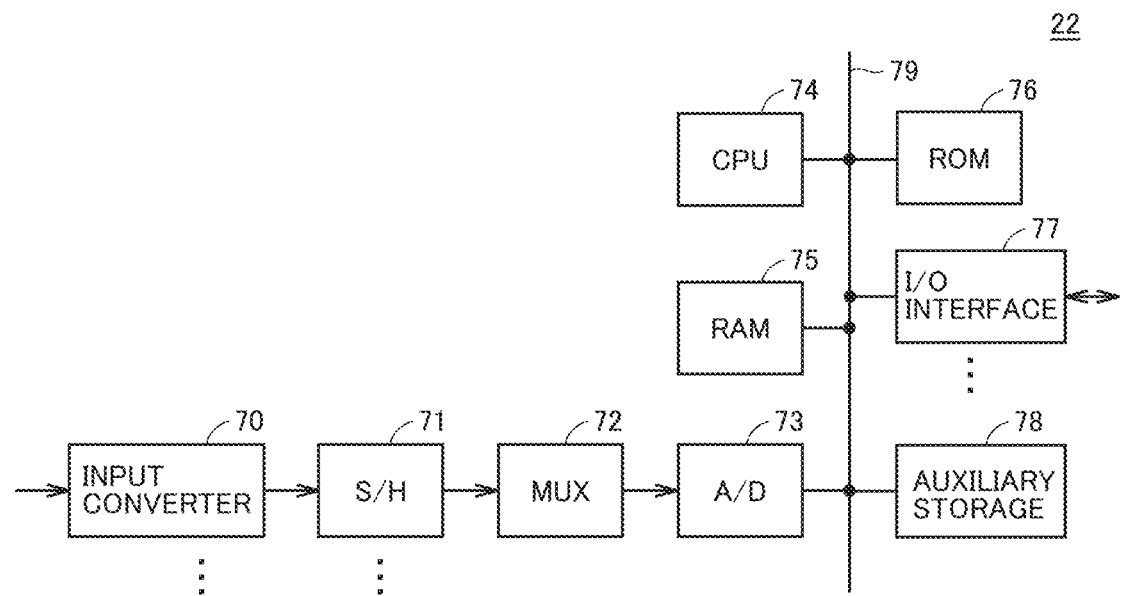
FIG. 4 is a block diagram showing one example hardware configuration of a control device.

FIG. 4 is a block diagram showing one example hardware configuration of the control device 22. FIG. 4 shows an example in which the control device 22 is configured of a computer.

Referring to FIG. 4, the control device 22 includes one or more input converters 70, one or more sample and hold circuits 71, a multiplexer (MUX) 72, and an analog to digital (A/D) converter 73. The control device 22 also includes one or more central processing unit (CPU) 74, a random access memory (RAM) 75, and a read only memory (ROM) 76. The control device 22 further includes one or more input/output (I/O) interfaces 77, an auxiliary storage 78, and a bus 79 interconnecting the components described above.

The input converter 70 has an auxiliary transformer for each input channel. Each auxiliary transformer converts the detection signal by each electrical quantity detector of FIG. 1 into a signal having a voltage level suited for the subsequent signal processing.

The sample and hold circuit 71 is provided for each input converter 70. The sample and hold circuit 71 samples and holds, at a prescribed sampling frequency, a signal representing an electrical quantity received from a corresponding input converter 70.

The multiplexer 72 subsequently selects the signals held by the sample and hold circuits 71. The A/D converter 73 converts the signal selected by the multiplexer 72 into a digital value. Note that multiple A/D converters 73 may be provided to perform an analog-to-digital conversion on the detection signals at multiple input channels in a parallel fashion.

The CPU 74 controls the entirety of the control device 22, and performs arithmetic processing in accordance with programs. The RAM 75, as a volatile memory, and the ROM 76, as a nonvolatile memory, are used as primarily storages of the CPU 74. The ROM 76 stores programs, and settings values for the signal processing, etc. The auxiliary storage 78 is a larger-scale nonvolatile memory, as compared to the ROM 76, and stores programs and electrical quantity detection value data, etc.

The I/O interface 77 is an interface circuit for communications between the CPU 74 and external devices.

Note that at least a portion of the control device 22 may be configured of a circuit, such as a field programmable gate array (FPGA) and an application specific integrated circuit (ASIC), etc. At least a portion of the control device 22 can also be configured of an analog circuit.

<Charging and Discharging Schemes>
(Charging Scheme)

Figure 5:
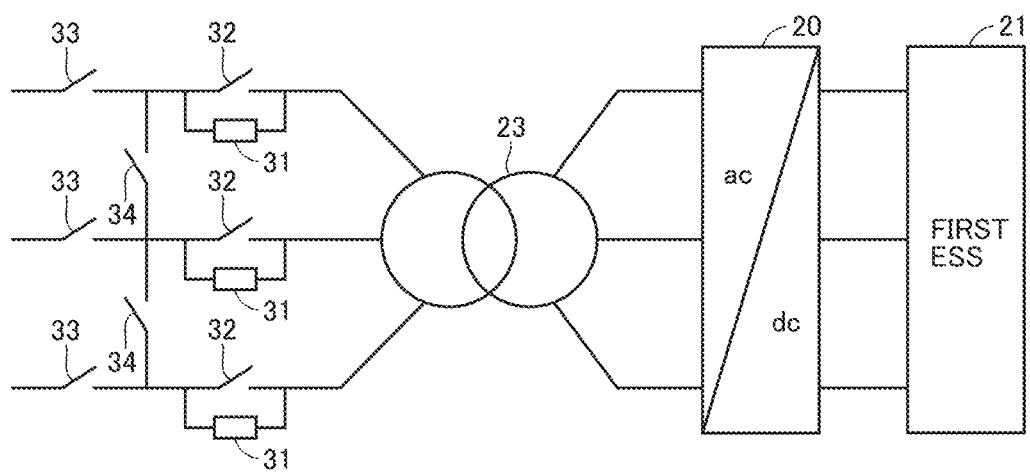
FIG. 5 is a diagram showing a portion of the configuration of the power control system according to Embodiment 1.
Figure 6:
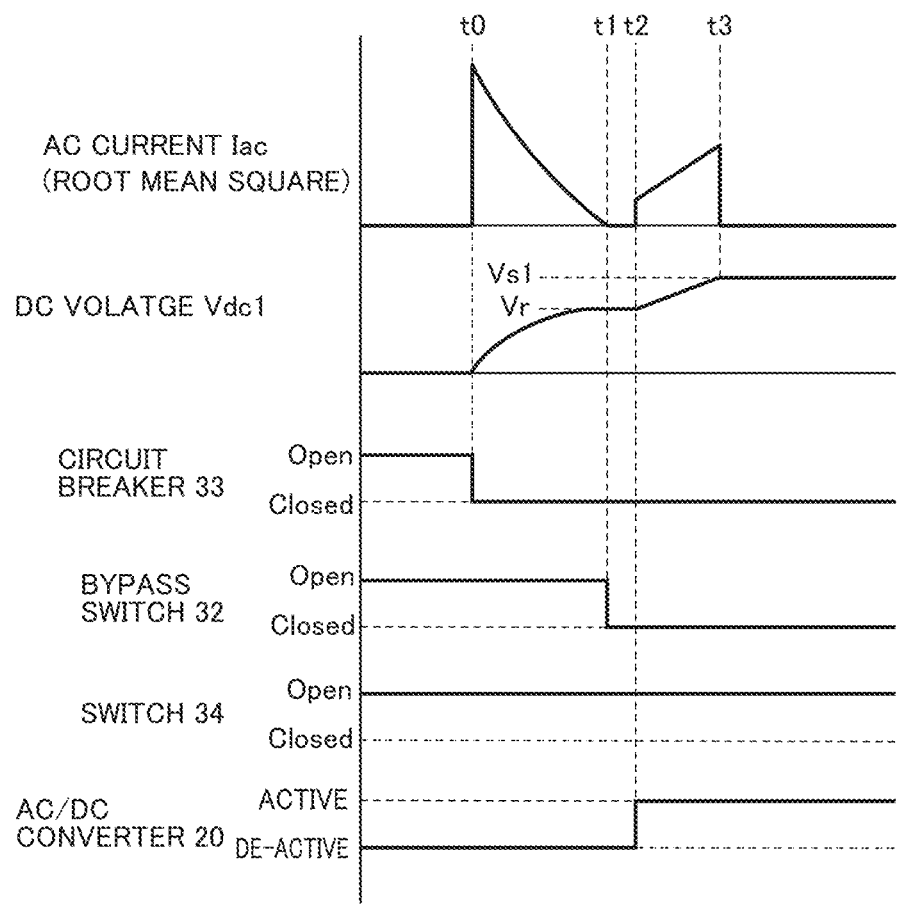
FIG. 6 is a timing chart for illustrating a flow of a charging scheme for the energy storage system according to Embodiment 1.

Referring to FIGS. 5 and 6, a charging scheme for the energy storage system according to Embodiment 1 is now described. The first energy storage system 21 is charged prior to a typical power conversion operation by the self-commutated converter 20.

FIG. 5 is a diagram showing a portion of a configuration of the power control system according to Embodiment 1. As shown in FIG. 5, the configuration of the power control system corresponds to a configuration in which the first energy storage system 21 is connected to the self-commutated converter 20 of (b) of FIG. 2. For ease of description, FIG. 5 does not show the control device 22, the AC power system 15, etc.

The configuration of FIG. 5 is by way of example, and, for example, the first energy storage system 21 may be connected to the self-commutated converter 20 of each of (a) of FIG. 2, (a) of FIG. 3, and (b) of FIG. 3. Note that the self-commutated converter 20 is connected to an external power supply (not shown) and operable with the power supplied from the external power supply.

FIG. 6 is a timing chart for illustrating a flow of the charging scheme of the energy storage system according to Embodiment 1. The AC current Iac of FIG. 6 indicates its level, which is, for example, the root mean square of the AC current Iac.

In the present embodiment, a configuration is described in which the opening and closing movements of the circuit breakers 33, the bypass switches 32, and the switches 34 are controlled by the control device 22. However, the present disclosure is not limited thereto. For example, an external device (e.g., a higher-level device, etc.) different from the control device 22 may control such opening and closing movements. In this case, the control device 22 and the external device are configured to be communicable with each other, and information that is required for the control is transmitted to/received from each other. For example, information indicating the open or closed state of each circuit breaker 33, bypass switch 32, and switch 34 is transmitted from the external device to the control device 22. In addition, information indicating the activation or de-activation of the self-commutated converter 20, the voltage information of the first energy storage system 21, etc. are transmitted from the control device 22 to the external device.

Referring to FIGS. 5 and 6, in the initial state, which is prior to charging the first energy storage system 21, the respective circuit breakers 33, bypass switches 32, and switches 34 are all open, and the self-commutated converter 20 is inactive.

At time t0, in order to initiate the charging of the first energy storage system 21, the respective circuit breakers 33 are closed. For example, the control device 22 transmits a control signal (e.g., an ON signal) to the respective circuit breaker 33 to close the respective circuit breaker 33. In other words, at the start of the DC power charging to the first energy storage system 21, the respective circuit breakers 33 are closed, the respective switches 34 are open, and the respective bypass switches are open.

This causes the system current (i.e., the AC current Iac) from the AC power system 15 to flow into the first energy storage system 21 via the resistor 31, the transformer 23, and the self-commutated converter 20. Therefore, the charging of the first energy storage system 21 begins, increasing the DC voltage Vdc1. At this time, the self-commutated converter 20 is inactive. Therefore, the DC voltage Vdc1 increases to a rectification voltage Vr due to the rectification by freewheeling diodes connected in anti-parallel to the self turn-off semiconductor devices in the self-commutated converter 20.

As the DC voltage Vdc1 reaches the rectification voltage Vr at time t1, the respective bypass switches 32 are closed. For example, the control device 22 transmits the control signal (e.g., the ON signal) to the respective bypass switches 32 to cause the respective bypass switches 32 to be closed. This bypasses the resistor 31.

In order to increase the DC voltage Vdc1 to the rectification voltage Vr or greater, at time t2 subsequent to time t1, the control device 22 launches and causes the self-commutated converter 20 to initiate power conversion operation. Specifically, the control device 22 controls the self-commutated converter 20 to convert the AC power from the AC power system 15 into DC power and output the DC power to the first energy storage system 21. This increases the DC voltage Vdc1, and the DC voltage Vdc1 reaches the rated voltage Vs1 at time t3. Then, the charging of the first energy storage system 21 completes.

According to the charging scheme, the control device 22 keeps the self-commutated converter 20 inactive during the time period from the start of charging (e.g., time t0) until the DC voltage Vdc1 of the first energy storage system 21 reaches the rectification voltage Vr (e.g., until time t1). Therefore, the first energy storage system 21 is naturally charged via the resistor 31, between time t0 and time t1.

Then, after the DC voltage Vdc1 reaches the rectification voltage Vr and the bypass switch 32 is closed, the control device 22 controls the self-commutated converter 20 to convert the AC power of the AC power system 15 into DC power and output the DC power to the first energy storage system 21. This causes, at and after time t2, the first energy storage system 21 to be charged, without involving the resistor 31, by controlling the self-commutated converter 20.

Therefore, according to the charging scheme, the resistor 31 may be prepared which enables the charging with power that is required for the DC voltage Vdc1 to reach the rectification voltage Vr.

(Discharging Scheme)

Figure 7:
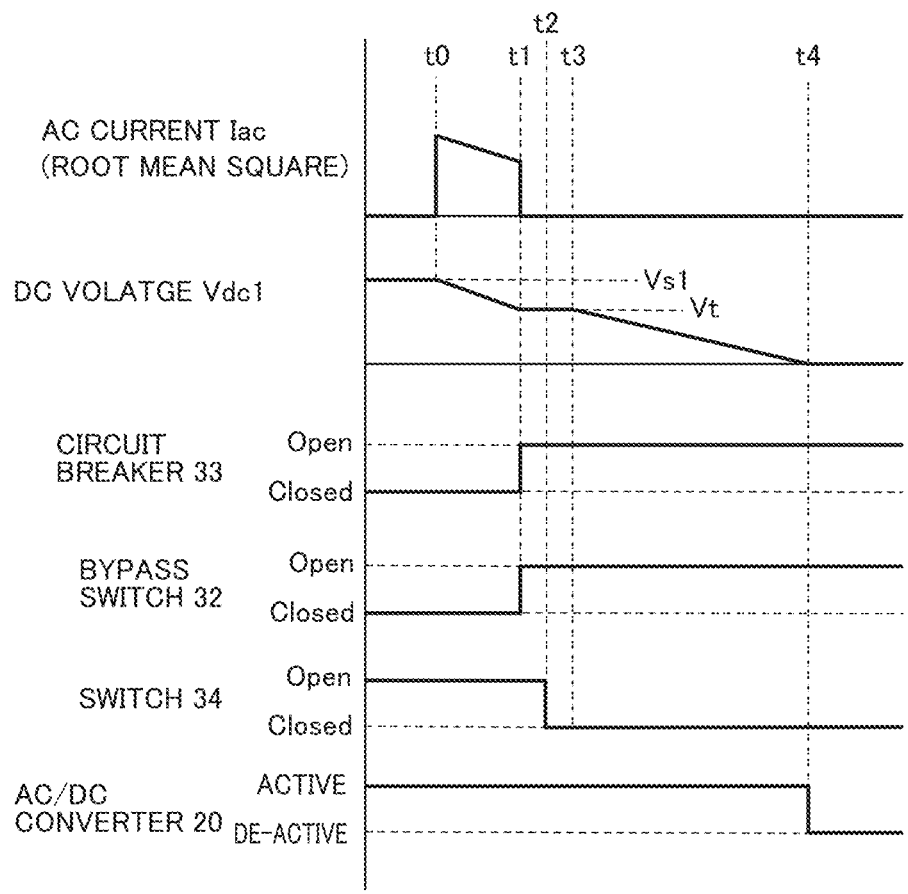
FIG. 7 is a timing chart for illustrating a flow of a discharging scheme for the energy storage system according to Embodiment 1.

Referring to FIGS. 5 and 7, a discharging scheme for the energy storage system according to Embodiment 1 is now described. The discharging of the first energy storage system 21 is performed to de-activate the self-commutated converter 20 for inspection of the self-commutated converter 20, for example.

FIG. 7 is a timing chart for illustrating a flow of the discharging scheme of the energy storage system according to Embodiment 1.

Referring to FIG. 7, in the initial state, which is prior to discharging of the first energy storage system 21, the respective circuit breakers 33 and the respective bypass switches 32 are closed, the respective switches 34 are open, and the self-commutated converter 20 is active.

At time t0, in order to initiate the discharging of the first energy storage system 21, the control device 22 controls the self-commutated converter 20 to discharge the DC power of the first energy storage system 21. Specifically, the control device 22 controls the self-commutated converter 20 to convert the DC power of the first energy storage system 21 into AC power and output the AC power to the AC power system 15. At this time, the control device 22 controls the self-commutated converter 20 to gradually discharge the DC power of the first energy storage system 21 to minimize the impact on the AC power system 15. The discharging of the first energy storage system 21 reduces the DC voltage Vdc1.

Since the self-commutated converter 20 is connected to the AC power system 15, a voltage Vt, which indicates a control limit voltage of the DC voltage Vdc1, depends on the system voltage of the AC power system 15. Specifically, although the DC voltage Vdc1 may be controlled to be the system voltage peak value of the AC power system 15 or less, if the DC voltage Vdc1 reduces less than this value, an output AC voltage peak value of the self-commutated converter 20 is constantly below a voltage peak value of the AC power system 15, causing the current to flow only in the direction from the AC power system 15 to the self-commutated converter 20.

Therefore, even if the control device 22 controls the self-commutated converter 20 to discharge the DC power of the first energy storage system 21, the DC voltage Vdc1 reduces only down to the voltage Vt.

As the DC voltage Vdc1 reaches the voltage Vt at time t1, the respective circuit breaker 33 and the respective bypass switch 32 are open. At time t2 subsequent to time t1, the respective switch 34 is closed. This forms a closed circuit which includes the respective resistor 31 and the self-commutated converter 20. In other words, due to the respective switch 34 being closed, a discharge path is formed for discharging the DC power of the first energy storage system 21 via the respective resistor 31, while the circuit breaker 33 is open.

At time t3 subsequent to time t2, the control device 22 controls the self-commutated converter 20 to convert the DC power of the first energy storage system 21 into AC power and discharge the AC power via the respective resistor 31. This causes the DC power of the first energy storage system 21 to be consumed by the respective resistor 31, reducing the DC voltage Vdc1. At time t3, as the DC voltage Vdc1 reaches a zero voltage, the control device 22 deactivates the self-commutated converter 20. This completes the discharging of the first energy storage system 21.

According to the discharging scheme, at the start (e.g., time t0) of the DC power discharging of the first energy storage system 21, the respective circuit breakers 33 and the respective bypass switches 32 are closed, and the respective switches 34 are open. During a time period from the start of discharging until the DC voltage Vdc1 of the first energy storage system 21 reaches the voltage Vt, the control device 22 controls the self-commutated converter 20 to convert the DC power output from the first energy storage system 21 into AC power and output the AC power to the AC power system 15. Due to this, the DC power of the first energy storage system 21 is gradually discharged between time t0 and time t1, without involving the resistor 31, thereby mitigating the impact on the AC power system 15.

Next, as the DC voltage Vdc1 reaches the voltage Vt, the respective circuit breaker 33 and the respective bypass switches 32 are open, and the respective switch 34 is closed. After the DC voltage Vdc1 reaches the voltage Vt, the control device 22 controls the self-commutated converter 20 to convert the DC power output from the first energy storage system 21 into AC power and discharge the AC power via the respective resistor 31. This forms, at time t2, a discharge path for discharging the power. At and after time t3, the power of the first energy storage system 21 is discharged via the respective resistor 31, and the power will therefore not be discharged to the AC power system 15.

Therefore, according to the discharging scheme, the resistor 31 may be prepared that can consume the power of the first energy storage system 21 remained at time t3, thereby achieving size reduction of the resistor 31 and cost reduction.

Embodiment 2

<Configuration of Power Control System>

Figure 8:
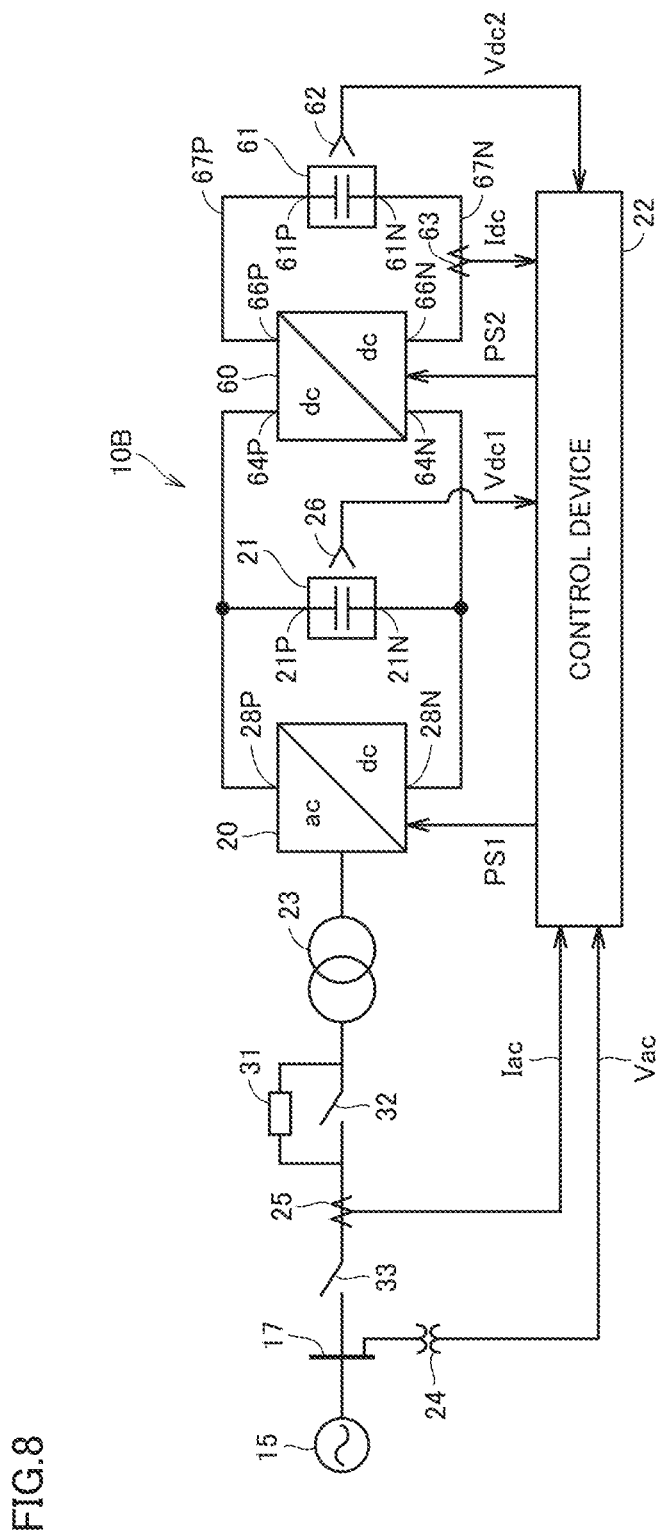
FIG. 8 is a block diagram showing a configuration of a power control system according to Embodiment 2.

FIG. 8 is a block diagram showing a configuration of a power control system according to Embodiment 2. Referring to FIG. 8, a power control system 10B differs from the power control system 10A according to Embodiment 1 of FIG. 1 in that the power control system 10B further includes a bidirectional DC/DC converter 60, a second energy storage system 61, a direct-current (DC) voltage detector 62, and a DC current detector 63.

The bidirectional DC/DC converter 60 is connected between a first energy storage system 21 and the second energy storage system 61. The bidirectional DC/DC converter 60 can perform bidirectional conversion of converting a DC power into a DC power having a different voltage. The bidirectional DC/DC converter 60 may be of an isolated type or a non-isolated type, and its configuration is not specifically limited.

The bidirectional DC/DC converter 60 has a pair of primary side terminals (i.e., a positive terminal 64P and a negative terminal 64N) which are connected to a pair of DC-side terminals (i.e., a positive direct-current terminal 28P and a negative direct-current terminal 28N), respectively, of a self-commutated converter 20, and further connected to a pair of input and output terminals (i.e., a positive terminal 21P and a negative terminal 21N) of a first energy storage system 21. The bidirectional DC/DC converter 60 has a pair of secondary side terminals (i.e., a positive terminal 66P and a negative terminal 66N) connected to a pair of input and output terminals (i.e., a positive terminal 61P and a negative terminal 61N), respectively, of the second energy storage system 61 via DC lines 67P and 67N, respectively.

Each of the primary side terminal and the secondary side terminal of the bidirectional DC/DC converter 60 may be configured of three terminals, further including a neutral terminal. In this case, the DC-side terminal of the self-commutated converter 20 is also configured of three terminals.

The second energy storage system 61 is configured to store, as energy, the DC power input via the pair of input and output terminals, and output the stored energy as DC power. Usually, since the second energy storage system 61 has a larger energy storage capacity than the first energy storage system 21, the second energy storage system 61 can store more energy.

The second energy storage system 61 has the same structure as the first energy storage system 21. Specifically, the second energy storage system 61 includes multiple power storage elements that are connected in series and parallel between the positive terminal 61P and the negative terminal 61N. Each power storage element may be, for example, a large capacitor such as an electrical double layer capacitor, or a storage battery. FIG. 8 symbolically shows a single power storage element.

The DC voltage detector 62 detects a DC voltage Vdc2 between the positive terminal 61P and the negative terminal 61N of the second energy storage system 61.

The DC current detector 63 detects a DC current Idc flowing to the DC line 67N on the negative side between the bidirectional DC/DC converter 60 and the second energy storage system 61. The DC current detector 63 may detect the current flowing to the DC line 67P on the positive side, instead of the DC line 67N on the negative side.

The control device 22 controls the operations of the self-commutated converter 20 and the bidirectional DC/DC converter 60. Specifically, in addition to generating a control signal (e.g., a PWM signal) PS1 for control ling the operation of the self-commutated converter 20, the control device 22 generates a control signal (e.g., a PWM signal) PS2 for controlling the operation of the bidirectional DC/DC converter 60. Based on the detected DC voltage Vdc1, DC voltage Vdc2, and DC current Idc, the control device 22 generates the PWM signal PS2. The PWM signal PS2 changes the duty cycle of the self turn-off semiconductor devices included in the bidirectional DC/DC converter 60. This allows the control of the operation of the bidirectional DC/DC converter 60.

Since the other configuration of FIG. 8 is the same as the configuration described with respect to FIG. 1, like or corresponding components will be given like reference characters and will not be described repeatedly.
<Charging and Discharging Schemes>
(Charging Scheme)

Figure 9:
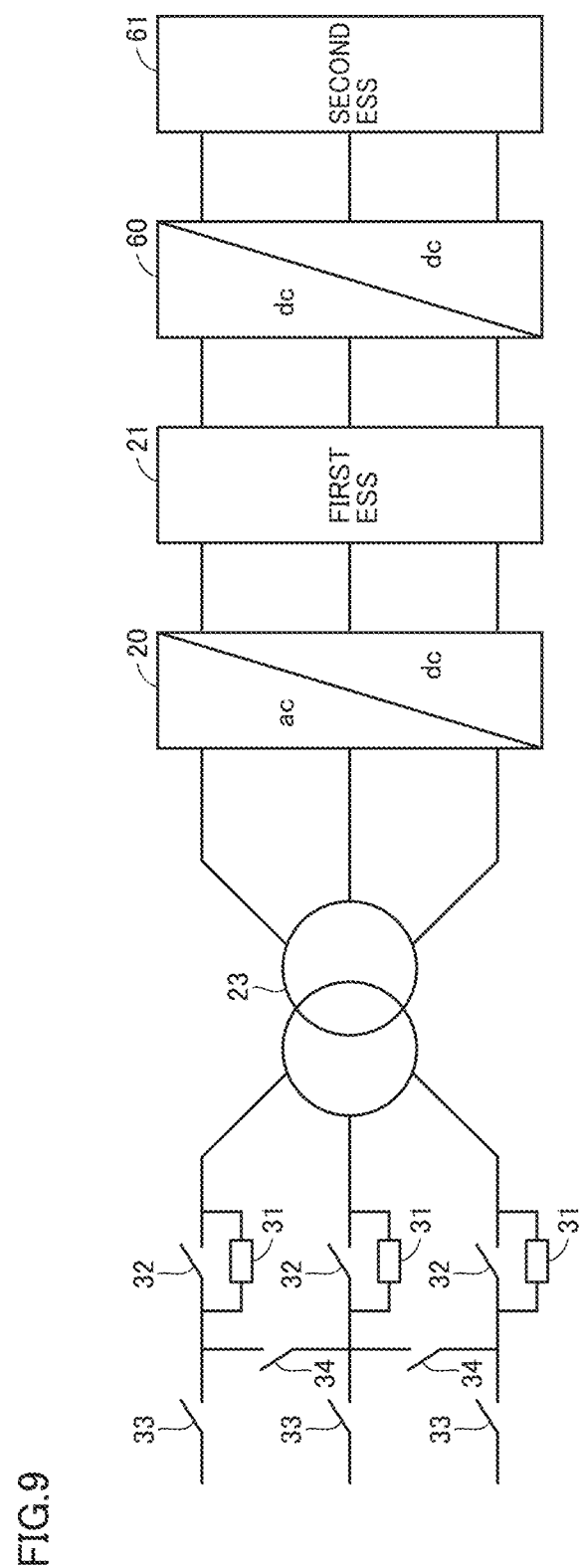
FIG. 9 is a diagram showing a portion of the configuration of the power control system according to Embodiment 2.
Figure 10:
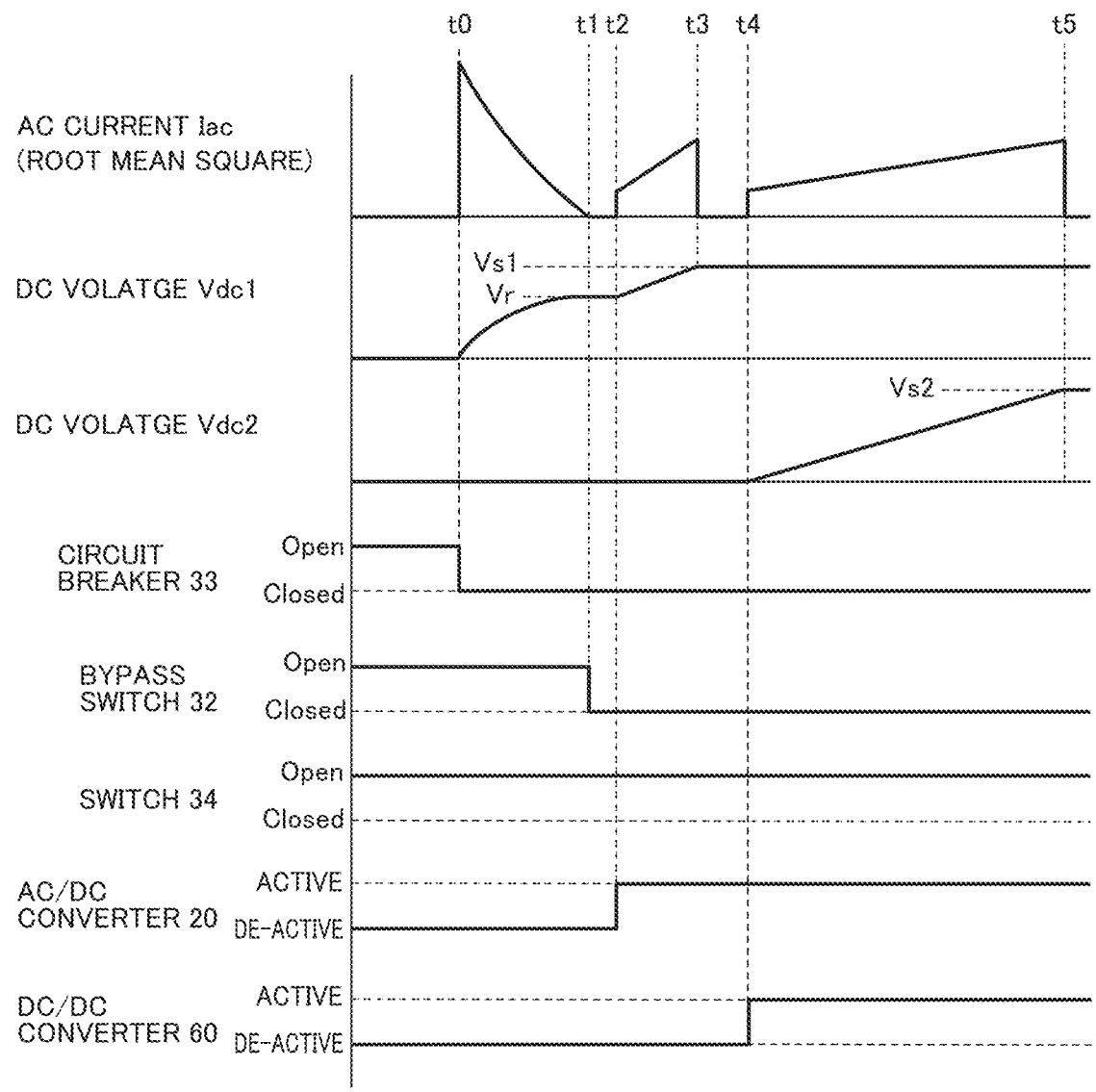
FIG. 10 is a timing chart for illustrating a flow of a charging scheme for the energy storage system according to Embodiment 2.

Referring to FIGS. 9 and 10, a charging scheme for the energy storage system according to Embodiment 2 is now described.

FIG. 9 is a diagram showing a portion of the configuration of the power control system according to Embodiment 2. Specifically, the configuration of the power control system of FIG. 9 corresponds to a configuration in which the self-commutated converter 20 of (b) of FIG. 2 is connected to the first energy storage system 21, the bidirectional DC/DC converter 60, and the second energy storage system 61.

The configuration of FIG. 9 is by way of example, and, for example, the first energy storage system 21, the bidirectional DC/DC converter 60, and the second energy storage system 61 may be connected to the self-commutated converter 20 of each of (a) of FIG. 2, (a) of FIG. 3, and (b) of FIG. 3. Note that the self-commutated converter 20 and the bidirectional DC/DC converter 60 are connected to an external power supply (not shown) and operable with the power supplied from the external power supply.

FIG. 10 is a timing chart for illustrating a flow of the charging scheme of the energy storage system according to Embodiment 2.

Referring to FIGS. 9 and 10, in the initial state, which is prior to charging the first energy storage system 21, the respective circuit breakers 33, bypass switches 32, and switches 34 are all open, and the self-commutated converter 20 is inactive. The flow in which the charging of the first energy storage system 21 is initiated at time t0 and the charging completes at time t3 is the same as the flow described with respect to FIG. 6, and the detailed description thereof will thus not be repeated.

At time t4 subsequent to time t3, the control device 22 activates and causes the bidirectional DC/DC converter 60 to initiate the power conversion operation. Specifically, the control device 22 controls the bidirectional DC/DC converter 60 to transfer the DC power from the first energy storage system 21 to the second energy storage system 61. This allows the second energy storage system 61 to be charged with the DC power output from the first energy storage system 21 via the bidirectional DC/DC converter 60, increasing the DC voltage Vdc2.

As the DC voltage Vdc2 reaches the rated voltage Vs2 at time t5, the charging of the second energy storage system 61 completes.

According to the charging scheme, the first energy storage system 21 is naturally charged via the resistor 31, between time t0 and time t1. Between time t2 to time t3, the first energy storage system 21 is charged, without involving the resistor 31, by controlling the self-commutated converter 20.

Next, after the completion of charging of the first energy storage system 21 with DC power and before the start of charging of the second energy storage system 61 with DC power, the respective resistor 31 is bypassed because the respective switch 34 is closed. The control device 22 controls the self-commutated converter 20 to convert the AC power of the AC power system 15 into DC power and output the DC power to the first energy storage system 21, and controls the bidirectional DC/DC converter 60 to transfer the DC power from the first energy storage system 21 to the second energy storage system 61, thereby charging the second energy storage system 61 with the DC power. This causes the second energy storage system 61 to be charged between time t4 and time t5.

This suggests that the charging via the resistor 31 is performed only during a period (i.e., between time t0 and time t1) until the DC voltage Vdc1 of the first energy storage system 21 reaches the rectification voltage Vr. Accordingly, similarly to Embodiment 1, the resistor 31 may be prepared which enables such charging. In particular, the second energy storage system 61 having a large storage capacity can be charged, without involving the resistor 31. Therefore, the resistor 31 does not need to be increased in size according the storage capacity size of the second energy storage system 61.

(Discharging Scheme)

Figure 11:
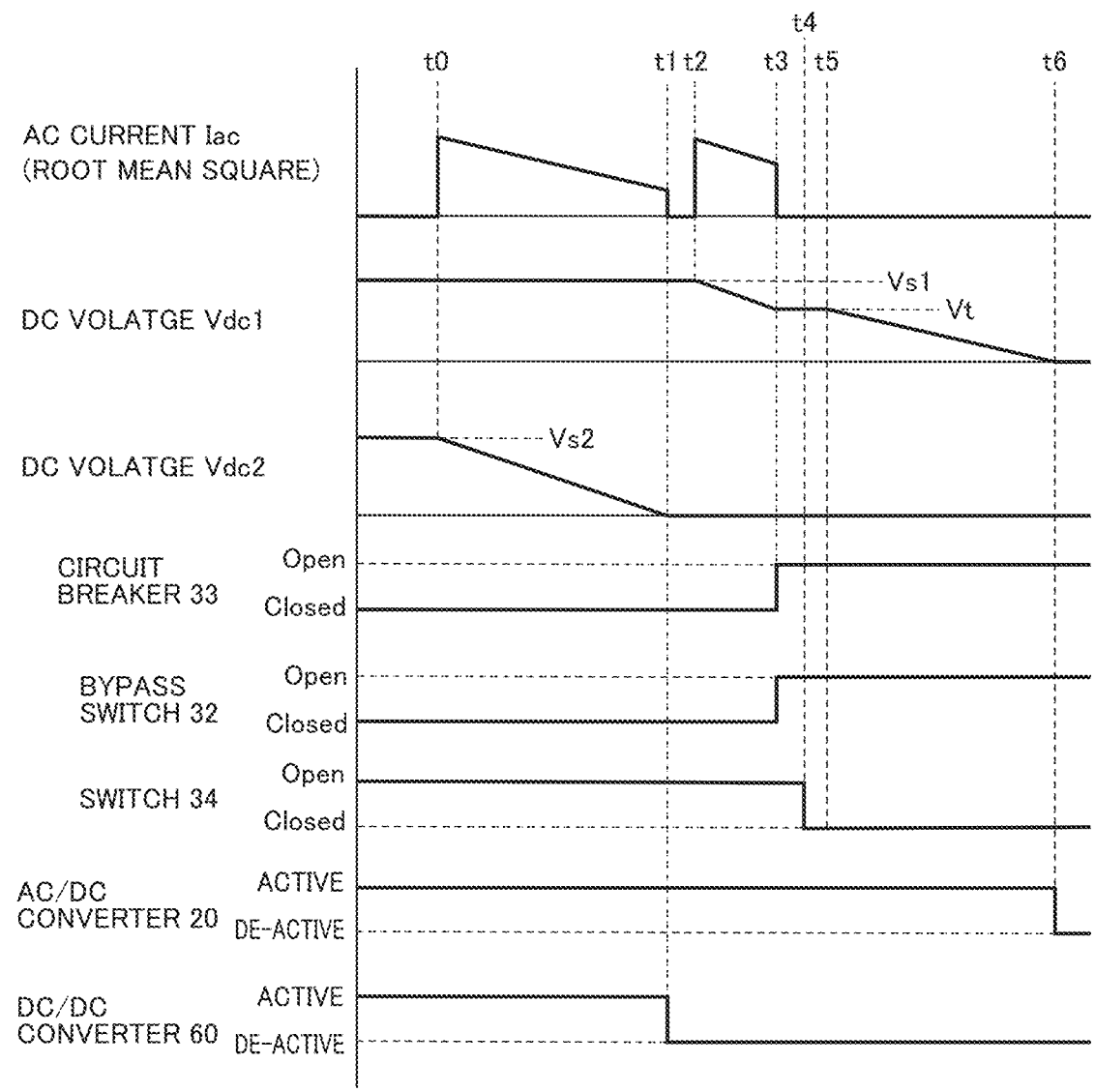
FIG. 11 is a timing chart for illustrating a flow of a discharging scheme for the energy storage system according to Embodiment 2.

Referring to FIGS. 9 and 11, a discharging scheme for the energy storage system according to Embodiment 2 is now described. FIG. 11 is a timing chart for illustrating a flow of the discharging scheme for the energy storage system according to Embodiment 2.

Referring to FIG. 11, in the initial state prior to the discharging of the second energy storage system 61, the respective circuit breakers 33 and bypass switches 32 are closed, the respective switches 34 are open, and the self-commutated converter 20 and the bidirectional DC/DC converter 60 are active.

At time t0, in order to initiate the discharging of the second energy storage system 61, the control device 22 controls the self-commutated converter 20 and the bidirectional DC/DC converter 60 to cause the second energy storage system 61 to discharge the DC power. Specifically, the control device 22 controls the bidirectional DC/DC converter 60 to transfer the DC power from the second energy storage system 61 to the first energy storage system 21 and controls the self-commutated converter 20 to convert the DC power output from the first energy storage system 21 into AC power and output the AC power to the AC power system 15.

At this time, the control device 22 controls the self-commutated converter 20 and the bidirectional DC/DC converter 60 to cause the second energy storage system 61 to gradually discharge the DC power, thereby minimizing the impact on the AC power system 15. Discharging of the second energy storage system 61 reduces the DC voltage Vdc2.

At time t1, as the DC voltage Vdc2 reaches a zero voltage, the discharging of the second energy storage system 61 completes. The control device 22, therefore, deactivates the bidirectional DC/DC converter 60.

After the completion of discharging of the DC power from the second energy storage system 61, discharging of the DC power from the first energy storage system 21 begins at time t2. The flow from the start to the completion of discharging of the first energy storage system 21 from time t2 to time t6 is the same as the flow of discharging from time t0 to time t4 of FIG. 7, and the detailed description thereof will thus not be repeated.

According to the discharging scheme, at the start (e.g., time t0) of the DC power discharging of the second energy storage system 61, the respective circuit breakers 33 and the respective bypass switches 32 are closed, and the respective switches 34 are open. During the time period from the start of discharging until the completion of the DC power discharging of the second energy storage system 61 (e.g., the time period from time t0 to time t1), the control device 22 controls the bidirectional DC/DC converter to transfer the DC power from the second energy storage system 61 to the first energy storage system 21, and controls the self-commutated converter 20 to convert the DC power output from the first energy storage system 21 into AC power and output the AC power to the AC power system 15.

When the DC power discharging of the second energy storage system completes, the control device 22 causes the bidirectional DC/DC converter 60 to de-activate. This allows the DC power to be gradually discharged, between time t0 and time t1, from the second energy storage system 61, without involving the resistor 31. Even between time t2 and time t3, the DC power is gradually discharged from the first energy storage system 21, without involving the resistor 31. This can mitigate the impact of the discharging on the AC power system 15. At and after time t5, the power of the first energy storage system 21 is discharged via the respective resistor 31, and the power will therefore not be discharged to the AC power system 15.

Therefore, according to the discharging scheme, the resistor 31 may be prepared that can consume the power of the first energy storage system 21 remained at time t5, thereby achieving size reduction of the resistor 31 and cost reduction.

Other Embodiment (1) In the embodiments described above, the second energy storage system 61 has a larger energy storage capacity than the first energy storage system 21. However, the present disclosure is not limited thereto. The second energy storage system 61 may have am energy storage capacity less than or equal to the energy storage capacity of the first energy storage system 21.

(2) In the embodiments described above, the self-commutated converter 20 and the bidirectional DC/DC converter 60 are operable with the power from the external power supply. However, when charging the first energy storage system 21 and the second energy storage system 61, the first energy storage system 21 is naturally charged until the DC voltage Vdc1 reaches the rectification voltage Vr. Therefore, the naturally charged first energy storage system 21 may be used as a power supply for the self-commutated converter 20 and the bidirectional DC/DC converter 60.

When discharging the second energy storage system 61, the first energy storage system 21 has been sufficiently charged. Therefore, the first energy storage system 21 may be used as a power supply for the bidirectional DC/DC converter 60.

(3) The configurations exemplified as the above-described embodiments are one example configuration of the present disclosure, and can be combined with other known technique, or can be modified, such as part of the configuration being omitted, without departing from the gist of the present disclosure. Moreover, in the above-described embodiments, the processes and configurations described in the other embodiments may be appropriately adapted and implemented.

The presently disclosed embodiment should be considered in all aspects as illustrative and not restrictive. The scope of the present disclosure is indicated by the appended claims, rather than by the description above, and all changes that come within the scope of the claims and the meaning and range of equivalency of the claims are intended to be embraced within their scope.

REFERENCE SIGNS LIST 10A, 10B power control system; 15 AC power system; 17 point of interconnection; 20 bidirectional AC/DC converter; 21 first energy storage system; 22 control device; 23 transformer; 24 AC voltage detector; 25 AC current detector; 26, 62 DC voltage detector; 31 resistor; 32 bypass switch; 33 circuit breaker; 34 switch; 60 bidirectional DC/DC converter; 61 second energy storage system; 63 DC current detector; 70 input converter; 71 sample and hold circuit; 72 multiplexer; 73 A/D converter; 75 RAM; 76 ROM; 77 I/O interface; 78 auxiliary storage; and 79 bus.

The invention claimed is:

1. A power control system, comprising:
a first energy storage system configured to store input DC power as energy and output the stored energy as DC power;
a bidirectional AC/DC converter for converting the DC power of the first energy storage system into AC power and converting AC power of an AC power system into the DC power, the bidirectional AC/DC converter being connected between the AC power system and the first energy storage system; and
a control device for controlling an operation of the bidirectional AC/DC converter, wherein
the control device controls the operation of the bidirectional AC/DC converter to control charging and discharging of the first energy storage system,
the power control system, further comprising:
a circuit breaker connected between the AC power system and the bidirectional AC/DC converter;
a resistor connected between the circuit breaker and the bidirectional AC/DC converter; and
a switch for forming a discharge path for discharging the DC power of the first energy storage system via the resistor while the circuit breaker is open, wherein
the discharge path is formed when the switch is closed,
the circuit breaker is closed and the switch is open at a start of discharging of the DC power of the first energy storage system, and
during a time period from the start of the discharging of the DC power of the first energy storage system until a voltage of the first energy storage system reaches a first threshold, the control device controls the bidirectional AC/DC converter to convert the DC power output from the first energy storage system into AC power and output the AC power to the AC power system.

2. The power control system according to claim 1, wherein
the circuit breaker is open and the switch is closed when the voltage of the first energy storage system reaches the first threshold, and
after the voltage of the first energy storage system reaches the first threshold, the control device controls the bidirectional AC/DC converter to convert the DC power output from the first energy storage system into AC power and discharge the AC power via the resistor.

3. The power control system according to claim 1, further comprising
a bypass switch for bypassing the resistor, the bypass switch being connected in parallel to the resistor, wherein
the bypass switch is closed at the start of the discharging of the DC power of the first energy storage system, and
the bypass switch is open when the voltage of the first energy storage system reaches the first threshold.

4. The power control system according to claim 1, further comprising:
a second energy storage system configured to store input DC power as energy and output the stored energy as DC power; and
a bidirectional DC/DC converter connected between the first energy storage system and the second energy storage system, wherein
the control device controls an operation of the bidirectional DC/DC converter.

5. The power control system according to claim 4, wherein
at the start of the discharging of the DC power of the second energy storage system, the circuit breaker is closed and the switch is open,
the control device:
controls the bidirectional DC/DC converter to transfer the DC power from the second energy storage system to the first energy storage system and controls the bidirectional AC/DC converter to convert the DC power output from the first energy storage system into AC power and output the AC power to the AC power system, during a time period from the start of the discharging of the DC power of the second energy storage system until completion of the discharging of the DC power of the second energy storage system; and
deactivates the bidirectional DC/DC converter upon the completion of the discharging of the DC power of the second energy storage system.

6. The power control system according to claim 5, wherein
upon the completion of the discharging of the DC power of the second energy storage system, discharging of the DC power of the first energy storage system starts.

7. The power control system according to claim 4, further comprising
a bypass switch for bypassing the resistor, the bypass switch being connected in parallel to the resistor, wherein
the bypass switch is closed at the start of the discharging of the DC power of the first energy storage system, and
the bypass switch is open when the voltage of the first energy storage system reaches the first threshold.

8. The power control system according to claim 7, wherein
the circuit breaker is closed, the switch is open, and the bypass switch is open at a start of charging of the first energy storage system with DC power,
the control device deactivates the bidirectional AC/DC converter during a time period from the start of the charging until the voltage of the first energy storage system reaches a second threshold,
the bypass switch is closed when the voltage of the first energy storage system reaches the second threshold, and
after the bypass switch is closed, the control device controls the bidirectional AC/DC converter to convert the AC power of the AC power system into DC power and output the DC power to the first energy storage system.

9. The power control system according to claim 8, wherein
upon completion of the charging of the first energy storage system with the DC power, the control device controls the bidirectional AC/DC converter to convert the AC power of the AC power system into DC power and output the DC power to the first energy storage system and controls the bidirectional DC/DC converter to transfer the DC power from the first energy storage system to the second energy storage system, to charge the second energy storage system with the DC power.

10. The power control system according to claim 4, wherein
the second energy storage system has a larger energy storage capacity than the first energy storage system.

11. The power control system according to claim 2, further comprising
a bypass switch for bypassing the resistor, the bypass switch being connected in parallel to the resistor, wherein
the bypass switch is closed at the start of the discharging of the DC power of the first energy storage system, and
the bypass switch is open when the voltage of the first energy storage system reaches the first threshold.

12. The power control system according to claim 2, further comprising:
a second energy storage system configured to store input DC power as energy and output the stored energy as DC power; and
a bidirectional DC/DC converter connected between the first energy storage system and the second energy storage system, wherein
the control device controls an operation of the bidirectional DC/DC converter.

13. The power control system according to claim 5, further comprising
a bypass switch for bypassing the resistor, the bypass switch being connected in parallel to the resistor, wherein
the bypass switch is closed at the start of the discharging of the DC power of the first energy storage system, and
the bypass switch is open when the voltage of the first energy storage system reaches the first threshold.

14. The power control system according to claim 6, further comprising
a bypass switch for bypassing the resistor, the bypass switch being connected in parallel to the resistor, wherein
the bypass switch is closed at the start of the discharging of the DC power of the first energy storage system, and
the bypass switch is open when the voltage of the first energy storage system reaches the first threshold.

15. The power control system according to claim 5, wherein
the second energy storage system has a larger energy storage capacity than the first energy storage system.

16. The power control system according to claim 6, wherein
the second energy storage system has a larger energy storage capacity than the first energy storage system.

17. The power control system according to claim 7, wherein
the second energy storage system has a larger energy storage capacity than the first energy storage system.

18. The power control system according to claim 8, wherein
the second energy storage system has a larger energy storage capacity than the first energy storage system.

19. The power control system according to claim 9, wherein
the second energy storage system has a larger energy storage capacity than the first energy storage system.

20. A power control system, comprising
a first energy storage system and a second energy storage system, wherein
the first energy storage system and the second energy storage system are each configured to store input DC power as energy and outputs the stored energy as DC power, the power control system, further comprising:
a bidirectional AC/DC converter connected between an AC power system and the first energy storage system;
a bidirectional DC/DC converter connected between the first energy storage system and the second energy storage system;
a parallel circuit connected between the AC power system and the bidirectional AC/DC converter; and
a control device for controlling an operation of each of the bidirectional AC/DC converter and the bidirectional DC/DC converter, wherein
the parallel circuit includes a resistor and a bypass switch for bypassing the resistor, the bypass switch being connected in parallel to the resistor,
after completion of charging of the first energy storage system with DC power and before a start of charging of the second energy storage system with DC power, the bypass switch is closed, and
the control device controls the bidirectional AC/DC converter to convert AC power of the AC power system into DC power and outputs the DC power to the first energy storage system, and control the bidirectional DC/DC converter to transfer the DC power from the first energy storage system to the second energy storage system, to charge the second energy storage system with the DC power, the power control system, further comprising:
a circuit breaker connected between the AC power system and the bidirectional AC/DC converter;
a switch for forming a discharge path for discharging the DC power of the first energy storage system via the resistor while the circuit breaker is open, wherein
the discharge path is formed when the switch is closed,
the circuit breaker is closed and the switch is open at a start of discharging of the DC power of the first energy storage system, and
during a time period from the start of the discharging of the DC power of the first energy storage system until a voltage of the first energy storage system reaches a first threshold, the control device controls the bidirectional AC/DC converter to convert the DC power output from the first energy storage system into AC power and output the AC power to the AC power system.

* * * * *